S. COOK.

AUTOMATIC BOILER-FEEDER.

No. 6,768. Reissued Nov. 30, 1875.

Witnesses
A. Rukfeert.
D. P. Cowl

Silas Cook
Inventor.
D. P. Holloway & Co
Attys

N. PETERS, PHOTO-LITHOGRAPHER, WASHINGTON, D. C.

BEST AVAILABLE COPY

S. COOK.

AUTOMATIC BOILER-FEEDER.

No. 6,768.

Reissued Nov. 30, 1875.

Witnesses.
A. Ruppert.
D. McCowl

Silas Cook
Inventor.
D. P. Holloway & Co.
Attys

N. PETERS, PHOTO-LITHOGRAPHER, WASHINGTON, D. C.

UNITED STATES PATENT OFFICE.

SILAS COOK, OF MAGNOLIA, ASSIGNOR, BY MESNE ASSIGNMENTS, TO THE AUTOMATIC BOILER-FEEDER COMPANY, OF DUBUQUE, IOWA.

IMPROVEMENT IN AUTOMATIC BOILER-FEEDERS.

Specification forming part of Letters Patent No. 97,361, dated November 30, 1869; reissue No. 5,276, dated February 11, 1873; reissue No. 6,768, dated November 30, 1875; application filed August 12, 1875.

*To all whom it may concern:*

Be it known that SILAS COOK, residing at Magnolia, in the county of Harrison and State of Iowa, was the inventor of a new and useful Improvement in Automatic Boiler-Feeders, of which the following is a specification:

This invention relates to an improved apparatus for automatically supplying water to steam-generators, so as to prevent the evaporation of the water so as to cause it to fall below a prescribed line, without immediately causing the introduction of a fresh supply. The first part of the invention relates to the mechanism for heating and supplying the water to the boiler-feeder; and the second part thereof to the mechanism by which the water is fed from the feeder to the boiler in definite quantities, and at intervals determined by the rapidity of evaporation in the boiler.

The water is first taken from the cistern or supply-tank, and passed into the hot-water chamber of the feeder, where it is heated by the waste heat of the exhaust steam. When the water increases in this chamber, by its introduction from time to time in a manner to be hereinafter explained, it is made to overflow into a chamber from which, when the chamber is filled, it is automatically discharged into the boiler. The mechanism is so arranged that this discharge in definite quantities occurs whenever and as often as the water in the boiler falls below a certain level, so that the intermittent supply of feed-water occurs at longer or shorter intervals, according to the rapidity of the evaporation.

Figure 1:
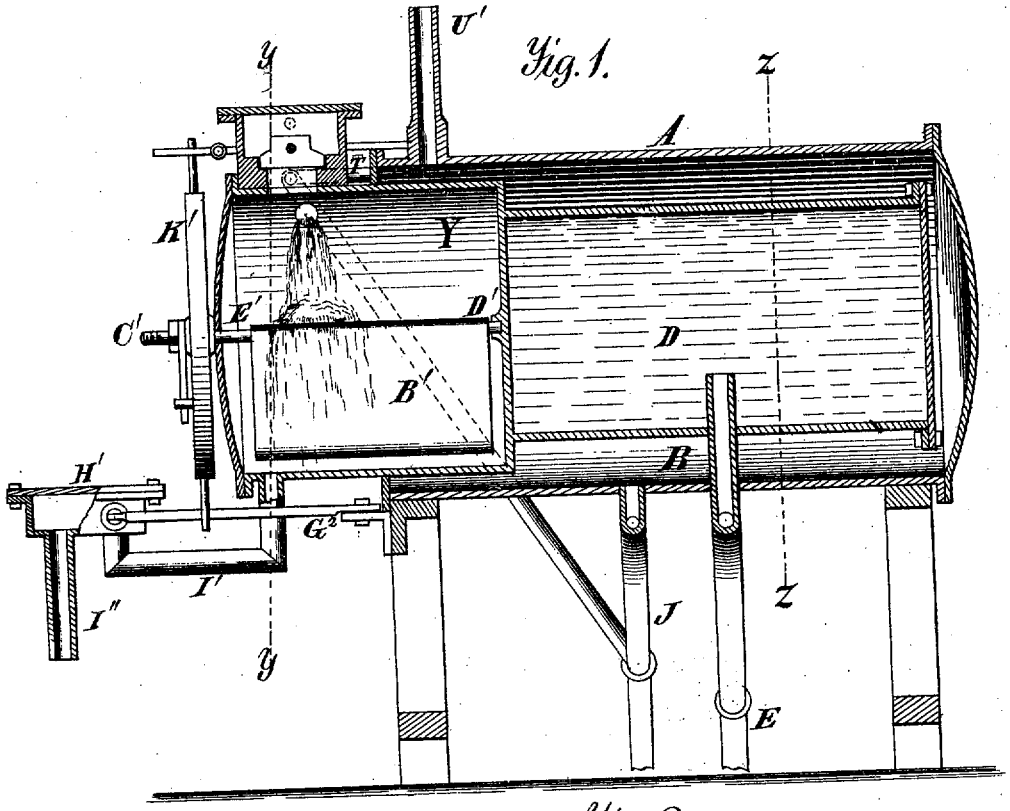
Figure 2:
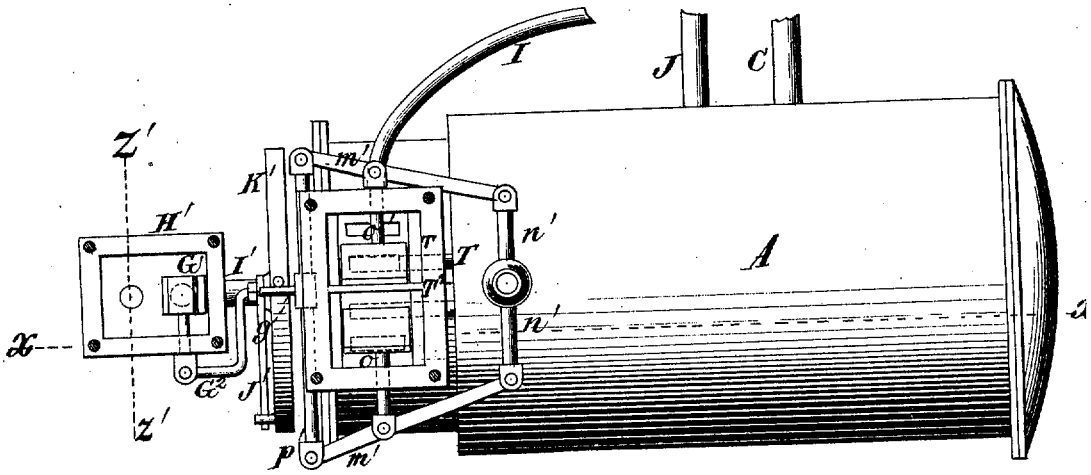
Figure 4:
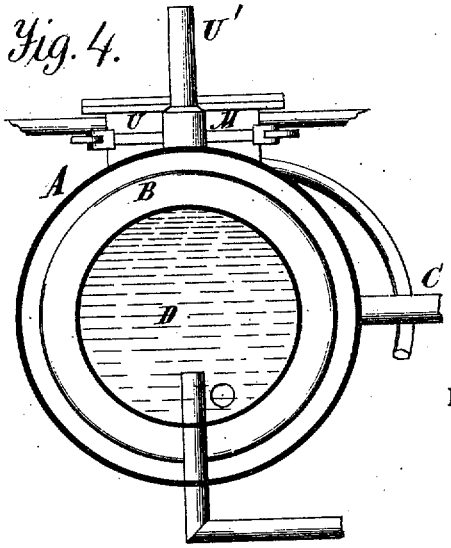
Figure 3:
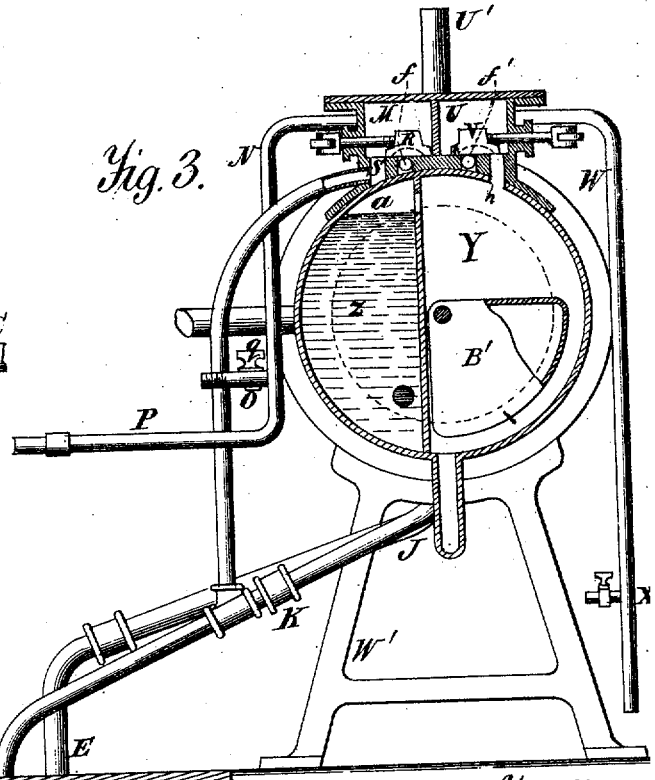
Figure 3:
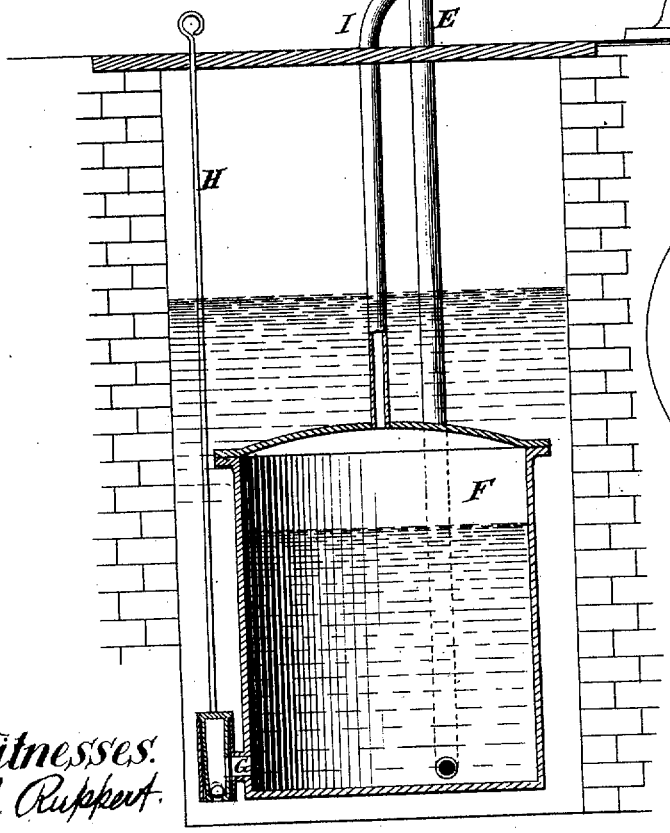
Figure 5:
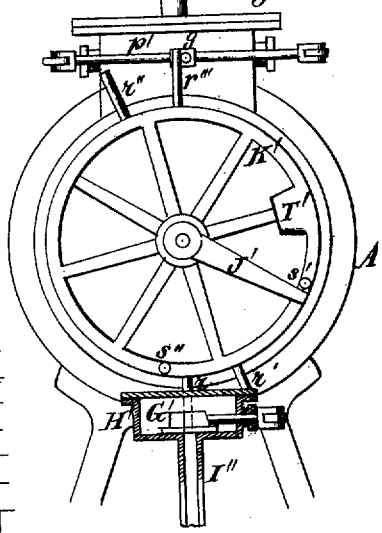

In the annexed drawings, making part of this specification, Figure 1 is a vertical section on the line *x x* of Fig. 2, showing the general arrangement of the parts of the feeder. Fig. 2 is a plan view, partly in section, to show the valves. Fig. 3 is a vertical transverse section on the line *y*, Fig. 1, showing, also, the supply-tank and cistern, and connecting-pipes. Fig. 4 is a transverse section on the line *z* of Fig. 1. Fig. 5 is a front elevation.

In the several figures the same letters are employed in the designation of identical parts.

Two concentric tubular shells provided with their independent heads form the heater, represented by the annular space B, and the water-chamber D, which is inclosed by the heater. Steam is supplied to the space B by means of the pipe C, which leads from the exhaust-ports of the engine, so that the escape steam passes into the annular space B, and is there condensed or permitted to pass out through the open pipe U′. The steam-chamber B, entirely inclosing the water-chamber D, gives up to water a portion of the heat of the exhaust steam, and such of the steam as is condensed flows from the steam-chamber into the supply-tank F through the pipes I K J, when there is no back pressure on a check-valve at K, to prevent its flowing from the steam-chamber into the tank.

The drawings illustrate the feed-water apparatus necessary for lifting the water from a reservoir on a lower level than the water-chamber.

In the reservoir is a tight tank, F, which is lined with wood or other good non-conductor of heat for the purpose of maintaining the temperature of the condensed steam coming hot from the steam-chamber B, and also to check the condensation of steam used for forcing the water up from the tank; and, for the same purpose, a float upon the surface of the water in the tank keeps the steam from direct contact with the water. Water in excess of what is supplied by the condensation comes through the hollow plug G, which is supplied with a ball-valve, permitting the water to flow into, but not out of, the tank. Other kinds of valve may be used for this purpose. The rod H is attached to the chamber, inclosing the valve to permit its ready removal. The steam which is employed to force up the water from the tank comes direct from the steam-generator or from the exhaust-port through a pipe, N, communicating with the boiler through the pipe O, and with the exhaust through the pipe P. This steam passes through the valve-chest M, and, when the valve R is in the position shown in Fig. 3, through the port S and pipe I into the space in the upper part of the tank F. If the pipe O is thus opened, so as to bring the pressure of the steam in the generator to bear on the surface of the water, it is obvious that, if this pressure, or that of the exhaust-steam coming through pipe P, is greater than the weight of the column of water reaching from the surface of the water in the tank to the water-chamber D, the water will be forced from the tank upward through the pipe E, which opens out from the bottom of the tank and leads into the water-chamber, and continues to flow until the water-chamber is full and can contain no more, or until the valve R is shifted and the port S closed.

The construction of the mechanism is such that the rising of the water in the feeder operates to close automatically the port S by shifting the valve, so that when the chamber is full the water will be shut off, and no more can be received until a portion of that in the chamber has been discharged. This is done by the following means: The water-chamber is divided into three compartments, respectively designated by the letters D, Z, and Y. There is a free communication through the partition which separates D and Z, so that the water will always remain at the same height in both, the chamber D being supposed to be full at all times. There is an opening through the partition which separates the compartments Z and Y, shown at *a*, Fig. 3, at the permanent water-line, through which, when water is admitted to the chamber D, a corresponding quantity will flow into the chamber Y. The rise of the water therein is made to perform the work of cutting off the supply, after which no more can be introduced until that which had passed into chamber Y has been drawn off. This is done by means of a float in chamber Y operating to trip the valves as it rises, and shifting them again when it falls. The float here illustrated is a quadrant-formed hollow box hermetically closed and attached at the angle by trunnions E′ D′, upon which the free end oscillates, swinging through one-fourth of a revolution with the rise and fall of the water.

The trunnion E′ passes out through a stuffing-box in the end of the chamber, and carries an arm, J′, fastened to and oscillating with it. On the same trunnion there is hung a loose wheel, K′, turning on, but not with, the shaft. Two stud-pins, $S^1$ $S^2$, are fastened so as to project from the face of the wheel about ninety degrees apart, and on either side of the arm J′, and in such relation thereto that as the float begins to rise the arm shall lift the wheel, which is weighted on that side at T′. When the float has risen to the top of chamber Y the wheel will have been turned until the weight T′ has passed the highest point in the circle, when its gravity will cause it to fall in the arc of the circle until a pin, $r^1$, projecting from the periphery of the wheel, strikes against the point *g′* on the system of levers, (clearly shown at *p′ m′ m′* in Fig. 2,) and shifts the valve R, the stem of which is attached to one of the levers, so as to close the port S, and thereby cut off the pressure of steam on the water in the tank, and stop its flow.

The pressure of the steam retained in the tank F and pipe I would keep the check-valve at K closed after the valve R had been shifted to close the port S. While the check-valve K is closed no water of condensation could flow from the steam-chamber B through the pipe J. To relieve this pressure a port, *f*, is constructed, opening from the steam-chest M into a short pipe, T, which leads across the open space and into the steam-chamber B. This port is always covered by the valve R, but the latter is recessed on its lower face, so that when it closes the communication between the induction steam-pipe N and the pipe I through the valve-chest it will open the communication between the tank and pipe I and steam-chamber B through the ports S and *f* and pipe T, and thereby establish an equilibrium of pressure in the tank and steam-chamber and pipe J, leading out of the latter and pipe I, so that there no longer being any resistance in the latter the check-valve K will fall open, and the water of condensation, at nearly a boiling-temperature, flow from the steam-chamber B into the tank.

It has already been explained how the compartment Y may be filled with water, and how its further admission may be stopped by shifting the valve R by means of the pin $r^1$ on the wheel K′. A pipe, $I^1$, leads from the bottom of Y into the valve-chest H′, containing a valve, $G^1$, controlling the communication between the valve-chest and the pipe $I^2$, which leads through the shell of the steam-generator, for supplying feed-water. A bent rod, $G^2$, is hinged to the head of the steam-chamber and to the stem of the valve $G^1$, which passes through a stuffing-box in the side of the valve-chest. When the pin $r^1$ strikes the tappet-pin *g* with the fall of the weight T′ another tappet-pin, $r^2$, on the opposite side of the wheel, strikes against the rod $G^2$, and shifts the valve $G^1$, so as to open the mouth of pipe $I^2$, when the water will immediately begin to flow from chamber Y, through pipes $I^1$ $I^2$, into the boiler, and while it flows (the admission of water from the tank being stopped) the float B′ will continue to fall until, just as it is empty, the oscillating arm J′, bearing against the pin $S^2$, will have turned the wheel until the weight T′ has passed the highest point, when it will again fall by gravity until the tappet-pin $r^3$ strikes against the point *g′* and shifts the valve R, so as again to admit the pressure of the steam through pipes N and I on the water in the tank, to force water again into the compartment Y. At the same time that the valve R is opened by the tappet-pin $r^3$ the valve $G^1$ will be closed by the tappet *r* striking against the arm or rod $G^2$, thereby cutting off the escape of the water from Y.

It is evident that something more is needed in order that the water will flow from Y into the boiler against the pressure of steam in the latter. To permit this an equal pressure must be established upon the surface of water in Y. To effect this another valve, V, is placed in the valve-chest U, formed by a partition which separates the chests M and U. This valve has a stem also passing through the chest, and pivoted to the arm $m'$, connected to that, which actuates valve R by the cross-rod $p'$, which carries the tappet-point $g'$, so that the same movement which closes the valve R opens the port $h$ of valve V, and allows steam from the boiler to rise through pipe W, which extends through the shell of the steam-generator, and passes into compartment Y, thus establishing an equilibrium of pressure above and below, and permitting the water to flow from the chamber Y into the steam-generator by gravity merely.

When the tappet opens the valve R to let on pressure in the tank, it at the same time closes the valve V, and relieves the pressure of steam in the chamber Y by opening communication under valve V, between port $h$ and port $f'$, which communicates, through a second short pipe, $T^2$, with the steam-chamber B, in which there is little or no pressure. Thus it will be seen that water can flow from Y into the boiler only when there is steam above it coming from the boiler directly.

The pipe W extends through the shell of the boiler so far that it opens at the intended water-line, which is assumed to be at X, Fig. 3. When the water in the boiler stands above the opening at X it is obvious that no steam can enter pipe W. The water will be forced up in the pipe, but even if the valve V is open, as also the valve $G^1$, and valve R being closed, it is obvious that the system of pipes W $I^1$ $I^2$, with chamber Y, form merely a siphon having both legs of equal length, terminating in the boiler; consequently there will be an equilibrium formed, and the water will remain motionless, filling the pipes and chamber Y.

Whenever the water in the generator is evaporated to such an extent that it falls below the opening X, the steam will be admitted into pipe W, and, the valve $G^1$ being open, there is nothing any longer to prevent the water from flowing out of Y into the boiler.

When the water in the boiler rises above the opening at X the flow will cease, to be resumed when the evaporation again reduces it so as to admit steam to the pipe W.

When the float falls to the bottom of compartment Y the valves R, V, and $G^1$ will be shifted, and water again forced from the tank into Y until it is again filled, when the valves will again be shifted, and if the water-level in the boiler is below X, it will be supplied from Y, which will continue to be filled and discharged as long as the water is below X; but when it rises above X the discharge of water from Y ceases until the level is reduced again, so as to let steam into pipe W.

The work of replenishing the boiler will be carried on whenever the water is below X, whether that reduction of level is produced by evaporation or by leakage.

The feeder, as it acts by gravity merely, must be placed somewhat above the level of the boiler.

What is claimed as the invention of said SILAS COOK, and desired to be secured by Letters Patent, is—

1. The valve R, operating substantially as described, to control the communication between the steam-pipe and the cistern, and also the communication between the steam-feeder and the cistern.

2. The combination, in a boiler-feeder, of the valve R and a float, $B'$, operating substantially as described, to control the entrance of steam into the cistern or tank, and thus automatically regulate the supply of water to the feeder, by raising it at regulated intervals by the direct pressure of the steam, substantially as set forth.

3. The combination, in a boiler-feeder, of the steam-chamber B, the water-chamber D, and the float-chamber Y, substantially as described.

4. The combination, in a boiler-feeder, of a water-chamber and inclosing steam-space, and a waste-pipe for the water of condensation, said waste-pipe connecting with the water-tank or cistern.

5. The combination of the steam-space B and the float-chamber Y by means of the valve V and ports $f'$ $h$, substantially as and for the purpose set forth.

6. The float $B'$, operated in the manner described, in combination with the arm $J'$ and the weighted wheel $K'$, having pins $r$, $r^1$, $r^2$, $r^3$, $S^1$, and $S^2$ thereon, to operate the valve-gear, in the manner specified.

7. In combination with the pipe $I^1$ $I^2$, the intermediate valve $G^1$, actuated, in opening and closing for the admission of feed-water into the boiler, by the rise and fall of the float $B'$, and the valve V simultaneously actuated with the valve $G^1$ for the admission of steam into the supply-chamber Y, to equalize the pressure on both sides of the valve $G^1$, substantially as set forth.

8. In combination with the chamber Y and pipe W, and ports $h$ and $f'$, the intermediate valve V, actuated, in opening and closing for regulating the escape of feed-water from the chamber Y, by the rise and fall of the float $B'$, substantially as set forth.

9. The combination, in a boiler-feeder, of a chamber, Y, and automatically-operated valves R, G, and V, by means of which the chamber is alternately filled with water and discharged into the boiler, substantially as set forth.

10. In combination with the valves R and V, the levers $m'$, rod $p'$, point $g'$, and tappet-pins on the periphery of wheel $K'$, whereby the valves are simultaneously shifted, substantially as set forth.

11. In combination with the chamber Y and the induction and eduction pipes, the valves R and $G^1$, alternately and automatically opened and closed for the introduction of water into the chamber, and its discharge by gravity, merely, into the boiler, and valve V, for equalizing the pressure in boiler and feeder, substantially as set forth.

12. In combination with the wheel K′ and tappet-pins on its periphery, the valve $G^1$, substantially as set forth.

13. In combination with the valves R and $G^1$, tappet-pins on the weighted wheel K, for alternately opening and closing the valves, substantially as set forth.

14. In combination with the float and chamber Y and pipes $I^1$, $I^2$, and W, the valves V and $G^1$, simultaneously and automatically opened and closed, substantially as set forth.

In testimony whereof I have signed my name in the presence of two subscribing witnesses.

SILAS COOK.

Witnesses:
W. H. EATON,
JOHN DEWELL.

In testimony whereof I have signed my name in the presence of two subscribing witnesses.

JNO. H. LULL.
*Secy. of The Automatic Boiler-Feeder Co.*

Witnesses:
H. A. SHUNK,
ALPHONSE MATTHEWS.

In testimony whereof I have, as president *pro tem.* of The Automatic Boiler-Feeder Company, also signed my name in the presence of two subscribing witnesses.

HENRY FORD,
*Pres. pro tem. of*
*The Automatic Boiler-Feeder Co.*

Attest:
S. B. JACKSON,
L. W. TULLER.